MAGNETIC RECORDING TAPE

Filed Sept. 17, 1968

INVENTORS
NORIO AKAI
TOMIZO TANIGUCHI

BY Craig & Antonelli

ATTORNEYS

United States Patent Office 3,595,694

Patented July 27, 1971

3,595,694

MAGNETIC RECORDING TAPE

Norio Akai and Tomizo Taniguchi, Ibaraki-shi, Japan, assignors to Hitachi Maxell, Ltd., Osaka-fu, Japan

Filed Sept. 17, 1968, Ser. No. 760,233
Claims priority, application Japan, Sept. 18, 1968, 42/60,034
Int. Cl. H01f *10/02*
U.S. Cl. 117—235 3 Claims

ABSTRACT OF THE DISCLOSURE

In a magnetic recording tape comprising a base film and a magnetic layer provided thereon, the improvement wherein the thickness of the base film and of the magnetic layer are respectively 38 to 42 microns and 12 to 8 microns, the magnetic material in the magnetic layer being needle-shape $\gamma$-$Fe_2O_3$ of 270 to 350 oersteds in coersive force, 0.1 to 0.3 micron in major axis length and 5 to 7 in major axis/minor axis ratio and the packing density of the magnetic material being not less than 1.7 g./cm.$^3$. The noise and the print effect in the magnetic recording tape are much reduced.

Figure 1:
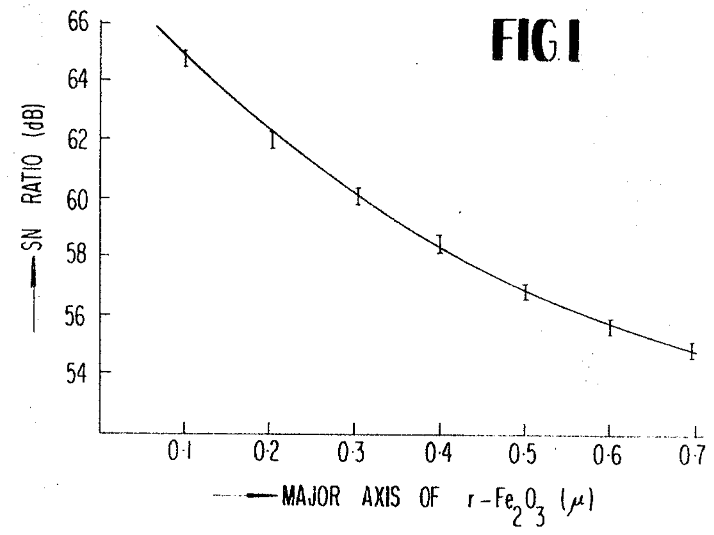

The present invention relates to a magnetic recording tape in which the noise and the print through are much reduced.

With advancement in magnetic recording technique, the creation of a magnetic recording tape of high sensitivity, improved frequency response, lower noise level, less print through and better electromagnetic properties has been required. However, it has been difficult to simultaneously improve the noise and the print effect because a change in the magnetic tape which would result in a lower noise level will result in an increase in the print through.

As the result of the careful study on the base film and the magnetic layer which constitute a magnetic recording tape, it has been found that the formation of the base film and the magnetic layer in certain thicknesses and the use of needle-shape $Fe_2O_3$ having appropriate magnetic and crystallographic properties for the magnetic material in the magnetic layer result in much improvement in the noise and the print effect and provide a magnetic tape of not less than 60 db in the SN ratio (signal-to-noise ratio) and not less than 53 db in the print effect. The present invention is based on this finding.

Accordingly, it is a main object of the present invention to provide a magnetic tape in which the noise and the print through are greatly reduced.

According to the present invention, a magnetic tape consists of a base film and a magnetic layer provided thereon, the thickness of the base film and of the magnetic layer being respectively 38 to 42 microns and 12 to 8 microns and the magnetic material in the said magnetic layer being needle-shape $\gamma$-$Fe_2O_3$ of 270 to 350 oersteds in coersive force, 0.1 to 0.3 micron in major axis length and 5 to 7 in major axis/minor axis ratio. Moreover, the packing density of the magnetic material in the magnetic layer is made not less than 1.7 g./cm.$^3$. Hereupon, the term "packing density" is intended to mean the weight of the magnetic material contained per unit volume of the magnetic layer.

By the above constitution, there is provided a magnetic recording tape of which the SN ratio is 60 db or more and the print effect is 53 db or more.

Practical and presently preferred embodiments of the present invention are illustratively shown in the following examples.

EXAMPLE 1

The magnetic material used in this example is needle-shape $\gamma$-$Fe_2O_3$ of 330 oersteds in coersive force, 3,800 gausses in saturating remanence, 2,080 gausses in remanence, 0.1 to 0.3 micron in length of major axis and 5 to 7 in major axis/minor axis ratio.

The magnetic material (60 kg.), vinylite resin "VAGH" [the trademark of vinyl chloride-vinyl acetate-vinyl alcohol (91:3:6) copolymer degree of polymerization, about 400; average molecular weight, about 2,800) manufactured by Union Carbon & Carbide Co., U.S.A.] (16 kg.), lauric acid (0.6 kg.), dioctyl phthalate (4 kg.), toluene (50 kg.) and methyl isobutyl ketone (50 kg.) are mixed thoroughly and dispersed by the use of a ball mill, and "Desmodule L" [the trademark of a triisocyanate compound obtained by the reaction between tolylene diisocyanate (3 mol) and trimethylolpropane (1 mol) manufactured by Bayer A.G., Germany] (3 kg.) is added thereto. The resultant mixture is applied to a cellulose acetate film of 39 microns in thickness to make 11 microns of the thickness of the applied mixture after drying. The magnetic layer is then subjected to calender treatment with a speed of 15 m./min. at a temperature of 110° C. under a pressure of 75 kg./cm.$^2$. The packing density of the magnetic material is measured to be 1.9 g./cm.$^3$.

The electromagnetic properties of the magnetic recording tape thus manufactured are shown in Table 1, compared with those of a conventional magnetic recording tape of which the constitution is as follows: the thickness of the base film (cellulose acetate), 36 microns; the thickness of the magnetic layer, 14 microns; the magnetic material, needle-shape $\gamma$-$Fe_2O_3$ (coersive force, 270 oersteds; saturating remanence, 3,760 gausses; remanence, 2,060 gausses; length of major axis, 0.7 to 1.0 micron; major axis/minor axis ratio, 5 to 7); the packing density of the magnetic material, 1.4 g./cm.$^3$; the composition of the binder for the magnetic layer, same as above.

TABLE 1

| | Signal frequency, Hz. | Magnetic recording tape of the invention | Conventional magnetic recording tape |
|---|---|---|---|
| Sensitivity (db) | 200 | 0.3 | 0 |
| Frequency response (db) | 1,000 | 0.5 | 0.3 |
| | 7,000 | 4.6 | 4.2 |
| SN ratio (db) | 1,000 | 63.0 | 58.0 |
| Print effect (db) | 1,000 | 54.0 | 51.0 |
| Erasure effect (db) | 1,000 | 73.0 | 70.0 |

EXAMPLE 2

The magnetic material used in this example is same as in Example 1.

The magnetic material (60 kg.), vinylite resin "VACH" [the trademark of vinyl chloride-vinyl acetate-maleic acid copolymer (degree of polymerization, 400 to 420; average molecular weight, about 2,750) manufactured by Union Carbon & Carbide Co., U.S.A.] (12 kg.), stearic acid (0.6 kg.), dibutyl phthalate (3 kg.), toluene (50 kg.) and methyl isobutyl ketone (50 kg.) are mixed thoroughly and dispersed by the use of a ball mill, and "Desmodule L" (2.8 kg.) is added thereto. The resultant mixture is applied to a cellulose acetate film of 40 microns in thickness to make 10 microns of the thickness of the applied mixture after drying. The magnetic layer is then subjected to calendar treatment as in Example 1. The packing density of the magnetic material is measured to be 1.9 g./cm.$^3$.

The electromagnetic properties of the magnetic recording tape thus manufactured are shown in Table 2.

TABLE 2

| | Signal frequency, Hz. | Magnetic recording tape of the invention |
|---|---|---|
| Sensitivity (db) | 200 | 1.2 |
| Frequency response (db) | 1,000 | 1.0 |
| | 7,000 | 6.0 |
| SN ratio (db) | 1,000 | 64.0 |
| Print effect (db) | 1,000 | 53.5 |
| Erasure effect (db) | 1,000 | 73.0 |

EXAMPLE 3

As in Example 1, the magnetic recording tapes are manufactured using as the magnetic material needle-shape $\gamma$-$Fe_2O_3$ of various length of major axis. The SN ratios of the magnetic recording tapes are determined, and the relationship between the length of the major axis and the SN ratio is shown in FIG. 1. From the figure, it is seen that the length of the major axis of $\gamma$-$Fe_2O_3$ must not be more than 0.3 micron for maintenance of the SN ratio more than 60 db. When, however, the length of the major axis is less than 0.1 micron, other electromagnetic properties become inferior.

EXAMPLE 4

Figure 2:
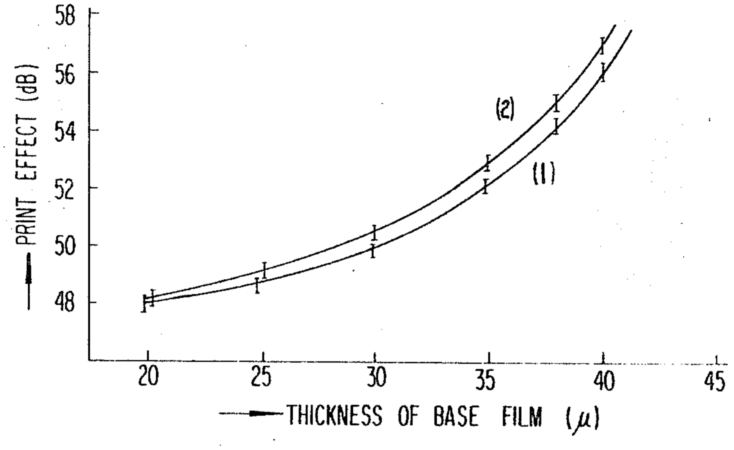

As in Example 1, the magnetic recording tapes are manufactured using as the base film cellulose acetate films of various thickness. The print effects of the magnetic recording tapes are determined, and the relationship between the thickness of the base film and the print effect is shown in FIG. 2, wherein the curves 1 and 2 indicate respectively the instances where the lengths of the major axis of the magnetic material are 0.15 to 0.20 micron and 0.30 micron. From the figure, it is seen that the thickness of the base film should be not less than 38 microns in order to obtain the print effect of more than 53 db. When, however, the thickness of the base film is made too thick, the magnetic layer must be made thin since the overall thickness of the tape is restricted by a standard. Thus, the thickness of the base film should not exceed 42 microns for obtaining a sufficient output.

What is claimed is:

1. In a magnetic recording tape comprising a base film and a magnetic layer provided thereon the improvement essentially comprising the thickness of the base film being about 38 to 42 microns and the thickness of the magnetic layer being about 12 to 8 microns, the magnetic material in said magnetic layer containing a binder and needleshape $\gamma$-$Fe_2O_3$ of about 270 to 350 oersteds in coersive force, about 0.1 to 0.3 micron in major axis length and about 5 to 7 in major axis/minor axis ratio, and the packaging density of the magnetic material being not less than about 1.7 g./cm.$^3$.

2. In a magnetic recording tape according to claim 1, the further improvement wherein the thickness of the base film is about 39$\mu$, the thickness of the magnetic layer is about 10$\mu$, the $\gamma$-$Fe_2O_3$ particles have a coersive force of about 330 oersteds, and the magnetic material has a packing density of about 1.9 g./cm.$^3$.

3. In a magnetic recording tape according to claim 1, the further improvement wherein the thickness of the base film is about 40$\mu$, the thickness of the magnetic layer is about 10$\mu$, the $\gamma$-$Fe_2O_3$ particles have a coersive force of about 330 oersteads, and the magnetic material has a packing density of about 1.9 g./cm.$^3$.

References Cited

UNITED STATES PATENTS

| | | | |
|---|---|---|---|
| 2,936,286 | 5/1960 | Feick et al. | 252—62.54X |
| 3,007,807 | 11/1961 | Radocy | 117—235 |
| 3,016,310 | 1/1962 | Andrew et al. | 117—235X |
| 3,240,621 | 3/1966 | Flower, et al. | 117—235X |
| 3,387,995 | 6/1968 | Senkpiel et al. | 117—235UX |

WILLIAM D. MARTIN, Primary Examiner

B. D. PIANALTO, Assistant Examiner

U.S. Cl. X.R.

252—62.54